United States Patent [19]

Godfrey

[11] 3,976,323

[45] Aug. 24, 1976

[54] CAB MOUNTING STRUCTURE

[75] Inventor: William H. Godfrey, Aurora, Ill.

[73] Assignee: Caterpillar Tractor Co., Peoria, Ill.

[22] Filed: Apr. 10, 1975

[21] Appl. No.: 566,650

Related U.S. Application Data

[63] Continuation of Ser. No. 408,666, Oct. 23, 1973.

[52] U.S. Cl. ................................ 296/102; 280/756
[51] Int. Cl.² .......................................... B62D 25/06
[58] Field of Search ............... 296/28 C, 35 R, 102,
296/35 A; 280/150 C; 180/69 R, 69 A

[56] References Cited
UNITED STATES PATENTS

| | | | |
|---|---|---|---|
| 1,609,850 | 12/1926 | Weymann | 296/102 X |
| 1,641,117 | 8/1927 | Carlson | 296/28 C |
| 2,921,799 | 1/1960 | Hatten | 296/102 X |
| 2,946,598 | 7/1960 | Foster | 296/102 X |
| 2,969,255 | 1/1961 | Nystrom | 296/102 |
| 3,080,191 | 3/1963 | Schmidt et al. | 296/35 R |
| 3,455,598 | 7/1969 | Tweedy et al. | 296/102 |
| 3,524,674 | 8/1970 | Medeiros | 296/102 |
| 3,866,942 | 2/1975 | Dobeus et al. | 280/150 C |

FOREIGN PATENTS OR APPLICATIONS 1,455,592   1/1969   Germany ........................ 296/35 R

*Primary Examiner*—Robert J. Spar
*Assistant Examiner*—Winston H. Douglas
*Attorney, Agent, or Firm*—Phillips, Moore, Weissenberger, Lempio & Strabala

[57] ABSTRACT

A vehicle includes a pair of substantially horizontal frame members, each defining a pair of apertures disposed transversely of the vehicle. A protective structure includes a pair of upwardly extending members, each defining transverse apertures which are sized and positioned so as to come into registry with the pair of apertures defined by a side member associated therewith. Pins are removably positionable in these registered apertures, each pin being positioned generally transversely of the vehicle.

1 Claim, 3 Drawing Figures

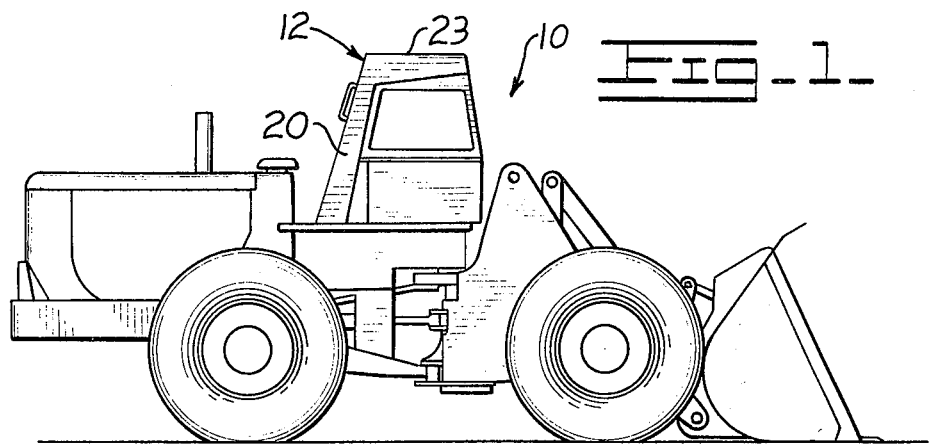
Fig_1_
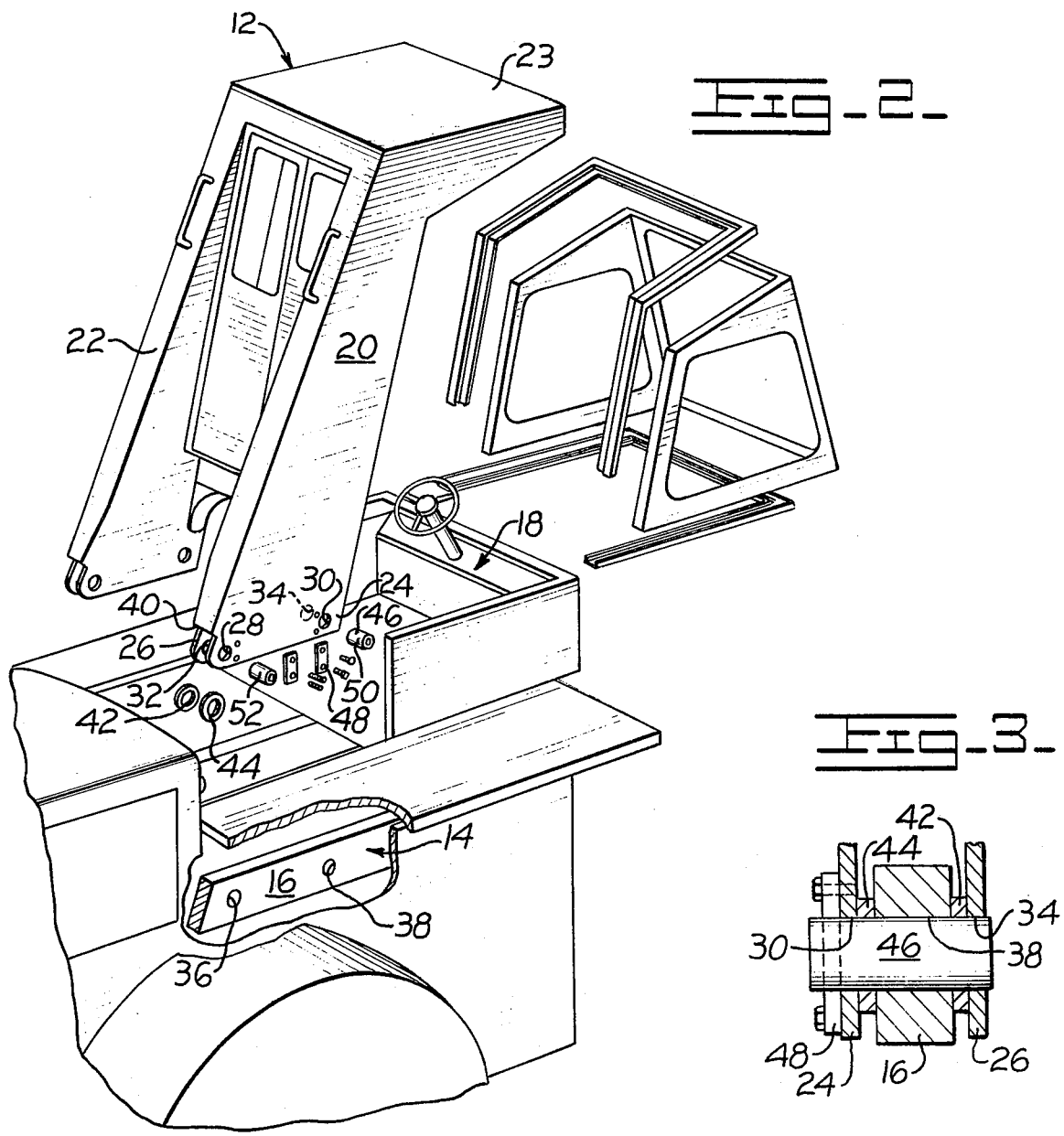
Fig_2_
Fig_3_

CAB MOUNTING STRUCTURE

This is a continuation, of Ser. No. 408,666, filed Oct. 23, 1973.

BACKGROUND OF THE INVENTION

This invention relates to vehicle cab structure, and more particularly to means for attaching such cab structure to the vehicle.

Current safety laws dictate that earthmoving machines be equipped with operator-protective devices. Examples of such devices are shown in U.S. Pat. No. 2,805,887 to Selby, U.S. Pat. No. 3,202,728 to Wood, U.S. Pat. No. 3,455,598 to Tweedy et al and U.S. Pat. No. 3,549,170 to Shankwitz (this last patent assigned to the assignee of this application). In the case of U.S. Pat. No. 2,805,887, U.S. Pat. No. 3,203,728, and U.S. Pat. No. 3,549,170, brackets of special design interconnect the protective structure with the frame structure of the vehicle so that forces of the protective structure will be transferred through the brackets to the frame of the vehicle. In the case of U.S. Pat. No. 3,455,598, the protective structure attaches to the axle housings of the vehicle. In each disclosed apparatus, it will be seen that the protective structure thereof connects with the frame of the vehicle through relatively complicated means, which do not lend themselves to easy removal and installation of the protective structure. It will be understood that it is desirable that such protective structure be easily removable from and attachable to a vehicle when and if service work is to be performed on the vehicle.

SUMMARY OF THE INVENTION

It is an object of this invention to provide protective structure for a vehicle which is effective in providing protection for the operator thereof during operation of the vehicle when such protective structure is secured to the frame of the vehicle.

It is a further object of the invention to provide protective structure for a vehicle which, while fulfilling the above object, is securable directly to the frame of the vehicle.

It is a further object of this invention to provide protective structure for a vehicle which while fulfilling the above objects, may be easily and conveniently fitted to and removed from the vehicle.

Broadly stated, the invention is in a vehicle having a frame including a pair of elongated generally horizontal side members, and an operator station adjacent said pair of side members. The invention is an improvement comprising a protective structure having first and second generally upwardly extending members, each upwardly extending member at its lower end defining an aperture disposed generally transversely of the vehicle, each side member defining an aperture disposed generally transversely of the vehicle, each lower end being positionable adjacent a side member to bring the aperture defined thereby into registry with the aperture defined by that side member. Further included are removable pin means positionable through the registered apertures on either side of the vehicle generally transversely of the vehicle to removably attach the protective structure to the frame.

BRIEF DESCRIPTION OF THE DRAWINGS

These and other objects of the invention will become apparent from a study of the following specification and drawings, in which:

FIG. 1 is a side elevation of a vehicle incorporating the invention;

FIG. 2 is an exploded view of a portion of the vehicle, showing the protective structure and means for mounting such protective structure to the frame of the vehicle; and FIG. 3 is a sectional view taken through a portion of the vehicle and showing the area of mounting of the protective structure to the frame of the vehicle.

DESCRIPTION OF THE PREFERRED EMBODIMENTS

In FIG. 1 is shown a vehicle 10 equipped with a protective cab structure 12. The vehicle 10 includes a frame 14 which further includes a pair of elongated generally horizontal side members (one shown at 16), and an operator station 18 positioned above and generally between and adjacent such side members. The protective structure 12 includes first and second generally upwardly extending and forwardly angled members 20, 22 and a roof portion 23 fixed to the members 20, 22 adjacent the upper ends thereof. Each member is associated with a side member in a similar manner, so that only member 20 and side member 16 and their association need be described in detail.

The lower portion of the member 20 at its lower end comprises a pair of substantially parallel plates 24, 26, plate 24 defining apertures 28, 30 which are disposed generally transversely of the vehicle 10, and plate 26 defining apertures 32, 34 which are also disposed generally transversely of the vehicle 10. The apertures 28, 32 are substantially aligned, and the apertures 30, 34 are substantially aligned.

The side member 16 defines apertures 36, 38 disposed generally transversely of the vehicle 10. The lower end of the member 20 is positionable so that plates 24, 26 are disposed on either side of the side member 16, and the apertures 28, 32, 36 are in registry, as are the apertures 30, 34, 38. The lower portion of the member 20 defines stop means 40 between the plates 24, 26 which contact the side member 16 to position the apertures 28, 30, 32, 34 at substantially proper height relative to the side member 16, so that apertures 28, 32, 36, and 30, 34, 38 may be easily brought into proper registry.

Shown as at 42, 44 are spacers provided between plate 16 and plate 24, and between plate 16 and plate 26 respectively to compensate for manufacturing tolerances between associated parts as necessary. A pin 46 is positionable through apertures 30, 38, 34 and may be locked in place by means of a locking plate 48 which bolts to side member 20 and seats in a slot 50 defined by the pin 46. The pin 46 is of course removable from the apertures 30, 38, 34 upon removal of the locking plate 48. A pin 52 is likewise associated with apertures 28, 36, 32. These pins 46, 52 are disposed generally transversely of the vehicle 10 and removably attach the protective structure 12 to the frame 14 of the vehicle 10.

With the protective structure so fixed and secured to the frame 14, the roof portion 23 is positioned generally over the operator's station 18.

If it is desired that the protective structure 12 be removed to aid in the servicing of the vehicle 10, the locking plates described above are removed and the pins 46, 52 are removed from their respective associated apertures. The protective structure 12 may then be easily removed from the vehicle 10.

As an alternative to spacers 42, 44, plates 24, 26 may be provided with tapped apertures through which setscrews are threadably disposed. The inner ends of these setscrews may be brought into engagement with the opposite surfaces of side member 16. It will be seen that the setscrews may be adjusted inwardly and outwardly of the side member 16 to compensate for machining tolerances between associated parts as necessary.

What is claimed is:

1. In a vehicle having a frame including a pair of elongated generally horizontal side members and an operator station adjacent said pair of side members, the improvement which comprises a protective structure having first and second generally upwardly extending members having a solid roof portion fixed to said upwardly extending members adjacent the upper ends thereof and positioned generally over the operator station with the protective structure so attached to said frame, door means supported by and disposed between the first and second upwardly extending members permitting access to the operator station, window means positioned beneath the roof portion and encompassing the operator station, each upwardly extending member at its lower end comprising first and second substantially parallel plates, each first plate defining first and second apertures disposed generally transversely of the vehicle, each second plate defining third and fourth apertures disposed generally transversely of the vehicle and substantially aligned with the first and second apertures defined by the first plate respectively, each side member defining first and second apertures disposed generally transversely of the vehicle, each lower end being positionable adjacent a side member so that the first and second plates thereof are disposed on either side of that side member, and the first aperture defined by that side member is in registry with the first and third apertures defined by the first and second plates respectively, and the second aperture defined by the side member is in registry witht the second and fourth apertures defined by the first and second plates respectively, removable pin means positionable through each set of three registered apertures on either side of the vehicle generally transversely of the vehicle, said removable pin means comprising a plurality of single threadless pins, each positionable in a set of three registered apertures, to removably attach said protective structure to said frame, and pin securing means for each of said single pins comprising a locking plate bolted to the upwardly extending member and seatable in a slot defined in a pin to limit the motion of the pin relative to the upwardly extending member.

* * * * *